(12) United States Patent
Rommer et al.

(10) Patent No.: US 9,537,821 B2
(45) Date of Patent: Jan. 3, 2017

(54) METHOD FOR PCC SUPPORT FOR SCENARIOS WITH NAT IN THE GW

(75) Inventors: Stefan Rommer, Västra Frölunda (SE); Fredrik Garneij, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 565 days.

(21) Appl. No.: 13/057,982

(22) PCT Filed: Feb. 1, 2011

(86) PCT No.: PCT/EP2011/051356
§ 371 (c)(1),
(2), (4) Date: Aug. 9, 2012

(87) PCT Pub. No.: WO2012/103931
PCT Pub. Date: Aug. 9, 2012

(65) Prior Publication Data
US 2014/0269740 A1    Sep. 18, 2014

(51) Int. Cl.
*H04L 29/12* (2006.01)
*H04W 8/26* (2009.01)
*H04L 29/06* (2006.01)
*H04W 92/24* (2009.01)

(52) U.S. Cl.
CPC ......... *H04L 61/256* (2013.01); *H04L 61/2507* (2013.01); *H04L 65/1069* (2013.01); *H04W 8/26* (2013.01); *H04W 92/24* (2013.01)

(58) Field of Classification Search
CPC ............... H04L 61/256; H04L 65/1069; H04L 61/2507; H04W 8/26; H04W 92/24
See application file for complete search history.

(56) References Cited

U.S. PATENT DOCUMENTS

| 8,289,975 | B2 | 10/2012 | Suganthi et al. | |
|---|---|---|---|---|
| 2003/0135630 | A1* | 7/2003 | Murrell | H04L 29/06 709/229 |
| 2005/0117591 | A1 | 6/2005 | Hurtta et al. | |
| 2009/0207757 | A1* | 8/2009 | Andreasen | H04L 12/1403 370/254 |
| 2009/0207759 | A1* | 8/2009 | Andreasen | H04L 12/1403 370/259 |
| 2009/0207823 | A1* | 8/2009 | Andreasen | H04L 12/1403 370/338 |

(Continued)

FOREIGN PATENT DOCUMENTS

| CN | 1650656 A | 8/2005 |
|---|---|---|
| CN | 1933492 A | 3/2007 |

(Continued)

OTHER PUBLICATIONS

3GPP TSG SA WG2 Meeting #81 TD S2-104656; Oct. 11-15, 2010, Prague, Czech Republic; Source: Cisco; Title: NAT in EPC.*

(Continued)

*Primary Examiner* — Andrew Lai
*Assistant Examiner* — Hoyet H Andrews
(74) *Attorney, Agent, or Firm* — Baker Botts, LLP (57) ABSTRACT

The invention relates to a method and system for network communication wherein a Policy and Charging Control Function (PCRF; 6) is aware of any Network Address Translator (NAT; 7) bindings of the user equipment (UE; 2).

6 Claims, 5 Drawing Sheets

(56) References Cited

U.S. PATENT DOCUMENTS

| | | | |
|---|---|---|---|
| 2009/0207843 A1* | 8/2009 | Andreasen | H04L 12/1403 370/392 |
| 2010/0272115 A1* | 10/2010 | Ramankutty | H04W 76/041 370/401 |
| 2010/0322252 A1* | 12/2010 | Suganthi | H04L 29/12339 370/395.53 |
| 2011/0065435 A1* | 3/2011 | Pancorbo Marcos | H04W 76/041 455/436 |
| 2011/0103266 A1* | 5/2011 | Andreasen | H04L 12/1403 370/259 |

FOREIGN PATENT DOCUMENTS

| | | |
|---|---|---|
| CN | 101321128 A | 12/2008 |
| JP | 2009267522 | 11/2009 |

OTHER PUBLICATIONS

3GPP TSG SA WG2 Meeting #81 TD S2-104509; Oct. 11-15, 2010, Prague, Czech Republic; Source: ZTE; Title: Impacts to the policy architecture when deploying NAT.*
ETSI TS 123 203 V9.7.0 (Jan. 2011); Technical SpecificationDigital cellular telecommunications system (Phase 2+); Universal Mobile Telecommunications System (UMTS); LTE; Policy and charging control architecture (3GPP TS 23.203 version 9.7.0 Release 9).*
S2-104656 discloses "NAT in EPC" (Title), 3GPP TSG SA WG2 Meeting #81 TD S2-104656 Oct. 11-15, 2010, Prague, Czech Republic.*
S2-104509 discloses "Impacts to the policy architecture when deploying NAT" (Title), 3GPP TSG SA WG2 Meeting #81 TD S2-104509, Oct. 11-15, 2010, Prague, Czech Republic.*
Digital cellular telecommunications system (Phase 2+); Universal Mobile Telecommunications System (UMTS); LTE•, Policy and charging control architecture, (3GPP TS 23.203 version 9.7.0 Release 9).*
3GPP TSG SA WG2 Meeting #81 TD S2-105162 discloses "NAT in EPC"; Document for Approval Oct. 11-15, 2010, Prague, Czech Republic.*
ETSI TS 123 203 V9.7.0 (Jan. 2011)Digital cellular telecommunications system (Phase 2+);Universal Mobile Telecommunications System (UMTS);LTE•Policy and charging control architecture (3GPP TS 23.203 version 9.7.0 Release 9).*
3GPP TSG SA WG2 Meeting #81 TD S2-104509, Oct. 11-15, 2010, Prague, Czech Republic.*
3GPP TSG SA WG2 Meeting #81 TD S2-104656, Oct. 11-15, 2010, Prague, Czech Republic.*
TR-23.803; 3GPP Doc, 3GPP TR 23.803 V1.0.0 (May 2005), dated May 2005, 3rd Generation Partnership Project; Technical Specification Group Services and System Aspects; Evolution of Policy Control and Charging (Release 7), pp. 02-48.*
S2-104656; 3GPP TSG SA WG2 Meeting #81 S2-104656, dated Oct. 11-15, 2010, Prague, Czech Republic; title: "NAT in EPC", pp. 1-7, Work Item / Release: 23.975 / Release 10, Source: Cisco.*
S2-105162; 3GPP Doc, 3GPP TSG SA WG2 Meeting #81 S2-105162, dated Oct. 11-15, 2010, Prague, Czech Republic; title: "NAT in EPC"; pp. 1-11; Work Item / Release: 23.975 / Release 10, Source: Cisco.*
S2-104509; 3GPP TSG SA WG2 Meeting #81 S2-104509, dated Oct. 11-15, 2010, Prague, Czech Republic; title: "Impacts to the policy architecture when deploying NAT"; pp. 1-12; Work Item / Release: IPv6 Migration / Rel-10, Source: ZTE.*
TS 123 203 V9.7.0 (Jan. 2011); titled: Digital cellular telecommunications system (Phase 2+); Universal Mobile Telecommunications System (UMTS); LTE; Policy and charging control architecture (3GPP TS 23.203 version 9.7.0 Release 9); dated Jan. 2011, pp. 1-99.*
3GPP TSG SA WG2 Meeting #81; Prague, Czech Republic; Title: NAT in EPC, Oct. 11-15, 2010.
Japanese Summary of Reason(s) for Refusal for Japanese Patent Application No. 2013-552110 (English translation attached), Nov. 4, 2014.
International Search Report mailed Jan. 2, 2013 in International Application No. PCT/EP2011/051356.
CISCO: "NAT in EPC", 3GPP Draft; S2-104656, Oct. 5, 2010, XP050459391, pp. 1-7.
ZTE: "Impacts to the Policy Architecture When Deploying NAT", 3GPP Draft; S2-104509 NAT PCC, Oct. 6, 2010, XP050459449, pp. 1-12.
3rd Generation Partnership Project; Technical Specification Group Services and System Aspects; IPv6 Migration Guidelines (Release 10); v1.2.1, Nov. 5, 2010, pp. 1-35, XP050461998.
3GPP TSG SA WG2 Meeting #81, Source: ZTE, Title: Impacts to the policy architecture when deploying NAT, SA WG2 Temporary Document, CPEL 1352419P, TD S2-104509, pp. 2-14, Oct. 11-15, 2010.
State Intellectual Property Office of People's Republic China, Search Report, First Search, Application No. 201180066586.6, 2 pages, Feb. 23, 2016.
State Intellectual Property Office, P.R. China, Patent Application No. 201180066586.6, First Office Action (PCT application entering into the national phase) and Text of First Office Action, CPEL 1352419P, 8 total pages, Mar. 17, 2016.

* cited by examiner

METHOD FOR PCC SUPPORT FOR SCENARIOS WITH NAT IN THE GW

This application is the U.S. national phase of International Application No. PCT/EP2011/051356, filed 1 Feb. 2011, which designated the U.S. the entire contents of which is hereby incorporated by reference.

TECHNICAL FIELD

The invention relates to a method and system for network communication comprising a user equipment, a gateway comprising a Policy and Charging Enforcement Function, an application function, a Policy and Charging Control Function and a Network and Port Address Translator. The Policy and Charging Control Function communicates with the Policy and Charging Enforcement Function and the application function. The user equipment connects to a network where after a Gx session between the Policy and Charging Enforcement Function and the Policy and Charging Control Function is started. The user equipment then starts a service session with the application function such that service signaling passes via the application function. An Rx session is created between the Policy and Charging Control Function and the application function. The Network and Port Address Translator is positioned between the user equipment and the application function for handling the service session.

ABBREVIATIONS

The following abbreviations are used in the application.
AF Application Function
AVP Attribute-value pair
BNG Broadband Network Gateway
GW GateWay
IMS IP Multimedia Subsystem
IMSI International Mobile Subscriber Identity
IP-CAN IP Connectivity Access Network
NAPT Network and Port Address Translator
NAT Network Address Translator
NAT44 IPv4-IPv4 NAT
PCC Policy and Charging Control
PCEF Policy and Charging Enforcement Function
PCRF Policy and Charging Control Function
P-CSCF Proxy Call Session Control Function
PDN Packet Data Network
PDN GW Packet Data Network Gateway
UE User Equipment
URI Uniform Resource Identifier
3GPP 3rd Generation Partnership Project
Rx Reference Point between a PCRF and an AF
Gx Reference Point between a PCEF and a PCRF

BACKGROUND ART

With the rapid depletion of available public IPv4 addresses there has been renewed interest in 3rd Generation Partnership Project (3GPP) and the operator community for techniques to reduce the impact due to lack of public IPv4 addresses. These techniques include IPv6 deployment as well as the use of private IPv4 addresses and Network Address Translation (NAT) or Network Address and Port Translation (NAPT).

In recent discussions in 3GPP on IPv6 migration, the IPv4 depletion problem has received big interest and several operators and vendors have brought up discussions regarding NAT44 usage. Deployment scenario and problem descriptions when using NAT and Policy and Charging Control (PCC) have been documented in TR 23.975. So far it has however not been decided whether or not 3GPP should do any normative work on providing new solutions to the problems identified.

When using PCC the presence of NAT/NAPT in the network causes certain problems. One of these problems is that session binding between Rx sessions and Gx sessions in the Policy and Charging Control Function (PCRF) does not work as expected when there is NAT/NAPT between the User Equipment (UE) and the Application Function (AF).

There is thus a need for a method that addresses the problems with session binding between Rx and Gx sessions when there is NAT/NAPT between the UE and the AF.

SUMMARY OF THE INVENTION

The object of the invention is to find a solution to the above identified problem so that the Rx and Gx sessions work as expected when there is NAT/NAPT between the UE and the AF.

The basic idea is to make the PCRF aware of the NAT bindings of the UE.

According to a first aspect of the invention a method is provided for a network communication system comprising a user equipment (UE), a gateway (being one of for instance a GGSN or a PDN GW) comprising a Policy and Charging Enforcement Function (PCEF), an application function (AF), a Policy and Charging Control Function (PCRF) and a Network and Port Address Translator (NAPT), where the PCRF communicates with the PCEF and the AF. The user equipment connects to a network where after a Gx session between the Policy and Charging Enforcement Function and the Policy and Charging Control Function is started. The UE starts a service session (SS) with the AF such that service signaling passes via the application function. An Rx session is created between the PCRF and the AF. A NAPT is positioned between the UE and the AF for handling the SS such that the PCRF is aware of any NAT bindings of the UE.

The method may further comprise a step where a message is sent to the PCRF every time an IP address and a port is allocated/deallocated on the outside of the NAT. In case the NAT is collocated with the GW, the global IP address and port information is provided by the GW to the PCRF via Gx. In case of standalone NAT, the information is provided by the NAT over a new interface between the NAT function and the PCRF.

The method may further comprise the steps where the GW/NAT pre-allocates a port range on the outside of the NAT when the PDN Connection is created and where the PDN GW provides this port range together with the global IP address to the PCRF at IP-CAN session establishment. In this way the PCRF knows the global IP address as well as all the ports that may be assigned to the UE and can make appropriate session binding based on this info.

The method may further comprise a step where the GW/NAT and the PCRF use a common algorithm to determine what port numbers are assigned to a UE on the outside of the NAT. By doing this only the global IP address needs to be signaled to the PCRF which is possible using existing Gx protocol.

According to another aspect of the invention a network communication system is provided comprising a user equipment (UE), a gateway (GGSN; PDN GW) comprising a Policy and Charging Enforcement Function (PCEF), an application function (AF), a Policy and Charging Control Function (PCRF) and a Network Address Translator (NAT);

the Policy and Charging Control Function (PCRF) is in communication with the Policy and Charging Enforcement Function (PCEF) and the application function (AF). The system is arranged in such a way that when the user equipment (UE) connects to a network, a Gx session is started between the Policy and Charging Enforcement Function (PCEF) and the Policy and Charging Control Function (PCRF). The system is further arranged in such a way that the user equipment (UE) starts a service session (SS) with the application function (AF) such that service signaling passes via the application function (AF). An Rx session is created between the Policy and Charging Control Function (PCRF) and the application function (AF). A Network and Port Address Translator (NAPT) is positioned between the user equipment (UE) and the application function (AF) for handling the service session (SS). The Policy and Charging Control Function (PCRF) is aware of any Network Address Translator (NAT) bindings of the user equipment (UE).

The system may be arranged such that the Policy and Charging Control Function (PCRF) receives a message every time an IP address and a port is allocated/deallocated on the outside of the Network Address Translator (NAT).

The system may be arranged such that the gateway (GGSN; PDN GW) and Network Address Translator (NAT) may be arranged to pre-allocate a port range on the outside of the Network Address Translator (NAT) when a gateway (GGSN; PDN GW) PDN Connection is created. The Policy and Charging Control Function (PCRF) is provided this port range together with the global IP address at an IP-CAN session establishment by the gateway (GGSN; PDN GW).

The system may be arranged such that the gateway (GGSN; PDN GW) and Network Address Translator (NAT) and the Policy and Charging Control Function (PCRF) may be arranged to use a common algorithm to determine what port numbers are assigned to a user equipment (UE) on the outside of the Network Address Translator (NAT).

The present invention has among its advantages that it presents a solution for support of PCC in the presence of NAT/NAPT between PCEF and AF.

The present invention further works with general AFs and requires no assumption that the application and AF is NAT aware.

The present invention works with both stand-alone NAPT and NAPT co-located with GW.

For NAT co-located with the GW, the solutions re-use existing interfaces and have small/no impact on the signaling load.

The present invention allows for the possibilities to increase and decrease port ranges for a PDN Connection dynamically All solutions can be used with collocated NAT or standalone NAT. In collocated case signalling will be on Gx. With standalone NAT signalling would be on a new interface between NAT and PCRF.

DETAILED DESCRIPTION

In FIGS. 1-5, the same reference numbers are used for like features.

As stated previously, when using Policy and Charging Control, PCC, the presence of NAT/NAPT in the network causes certain problems. One of these problems is that session binding between Rx and Gx sessions in the PCRF does not work as expected when there is NAT/NAPT between the UE and the AF.

Figure 1:
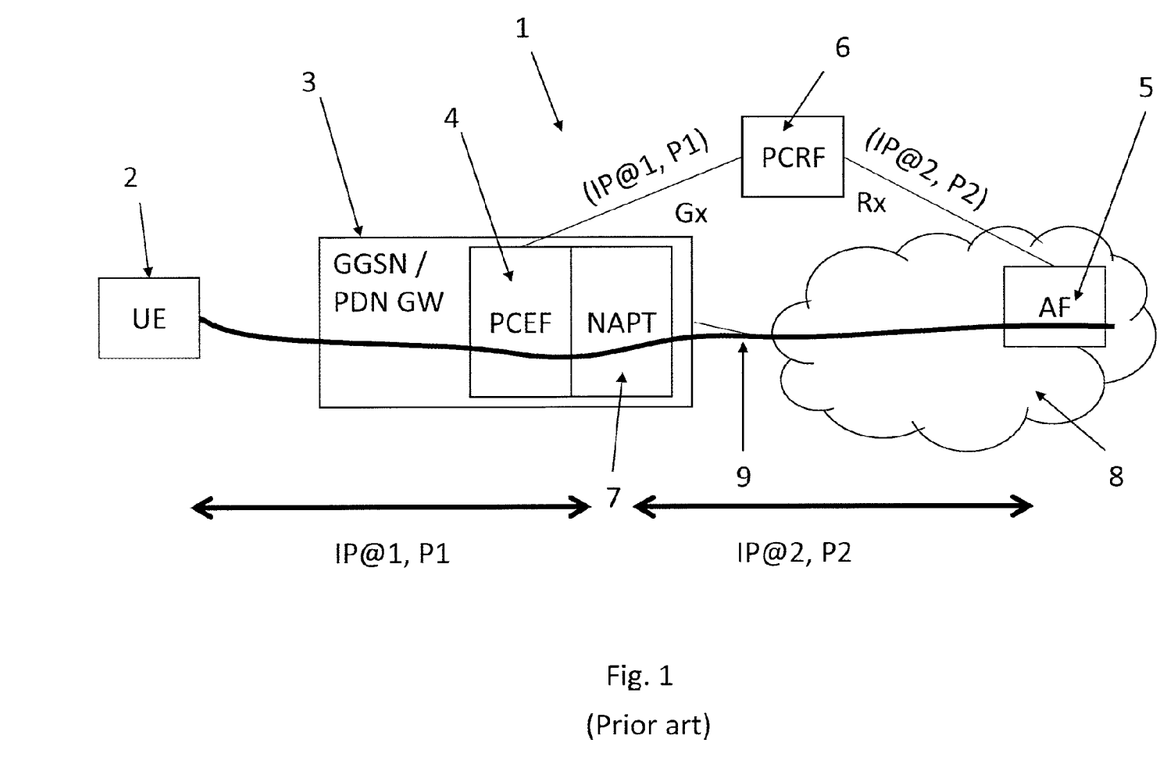
FIG. 1 schematically shows a network communication system according to a first aspect of prior art.

FIG. 1 schematically illustrates a network communication system 1 comprising a user equipment (UE) 2, a gateway (GW) 3 comprising a Policy and Charging Enforcement Function (PCEF) 4, an application function (AF) 5, a Policy and Charging Control Function (PCRF) 6 and a Network and Address Translator (NAT) Function 7, in this case a Network and Port Address Translator (NAPT), where the PCRF 6 communicates with the PCEF 4 and the AF 5. In FIG. 1 the NAT function 7 is co-located with the GW 3. The GW 3 may for example be a GGSN or PDN GW. In case the network communication system uses a 3G standard a GGSN may be used. In case the network uses a 4G standard (or 3GPP LTE or 3GPP LTE Advanced) a PDN gateway may be used. In FIG. 1, the PCEF 4 is also co-located with the GW 3. The GW 3 provides the UE 2 an IP address as assigned for the PDN Connection IP@1 to the PCRF 6 during IP-CAN session Gx establishment. When the UE 2 starts a service session (SS) and the service signaling passes via the AF 5, the AF 5 will however not see IP@1 but rather the translated IP address IP@2 provided by the NAT function 7 and the translated port P2 provided by the NAT function 7. The AF 5 may possibly provide P2 to the PCRF 6. The PCRF 6 is unable to perform session binding, i.e. it will not be able to associate the Rx request for IP@2 with the corresponding IP-CAN session that is using IP address IP@1. FIG. 1 also schematically illustrates the PDN 8 which is the IP network where the services are provided and also the user plane traffic 9 for the SS.

Figure 2:
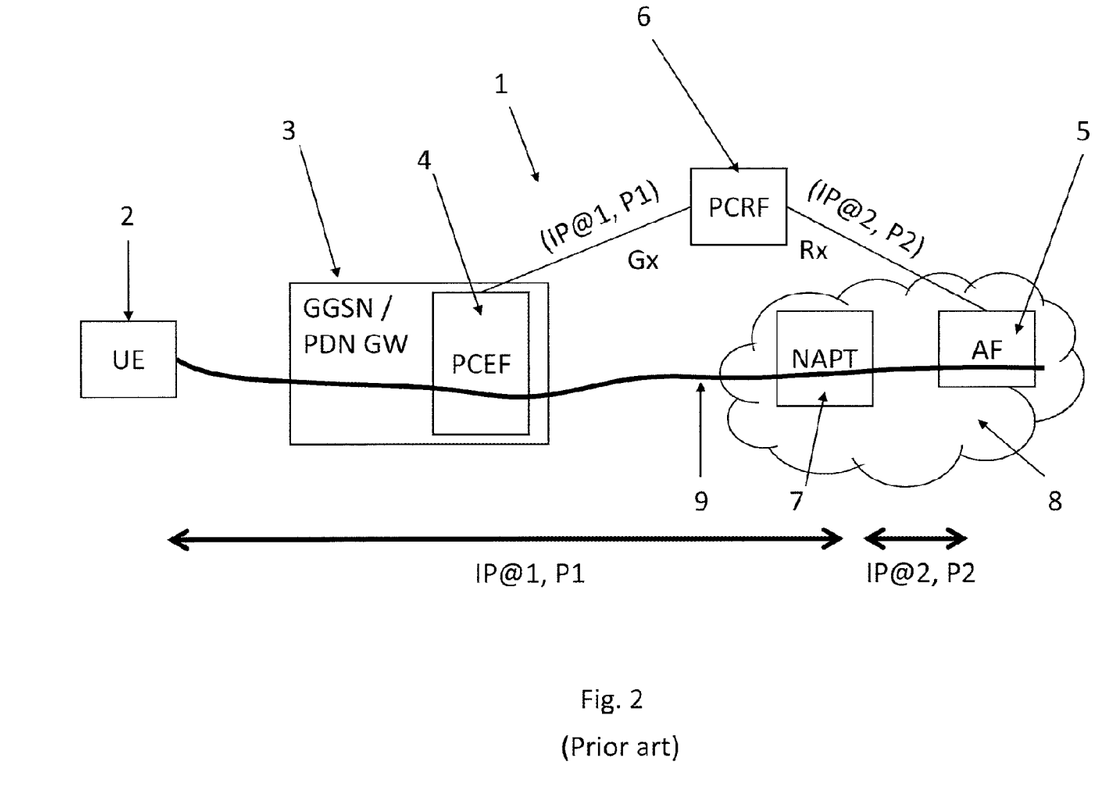
FIG. 2 schematically shows a network communication system according to a second aspect of prior art.

FIG. 2 illustrates a similar case where the NAT function 7 is standalone, external to the GW 3, and the AF 5 is located outside the NAT box 7. The PCEF 4 is still co-located with the GW 3. Similar problems as described in relation to FIG. 1 exist also for this configuration. FIG. 2 also schematically illustrates the PDN 8 which is the IP network where the services are provided and also the user plane traffic 9 for the SS.

One "solution" to the problem with NAT is to avoid the problem in the first place. For example, if the AF is placed so that there is no NAT between the GW and the AF there is no issue with applying PCC. This deployment may be reasonable for operator deployed applications but may not be suitable e.g. for 3$^{rd}$ party applications where the AF is located outside the operator's network.

Another solution is to make the application and the AF "NAT aware". This is the type of solution that has been specified for 3GPP IMS. This solution assumes that the AF is aware of the NAT binding between private and public addresses. The AF, for example P-CSCF for IMS, can then provide the private IP address IP@1 via Rx to the PCRF. The PCRF can then perform session binding as usual. The drawback with this approach is that it puts requirements on the application and the AF. This may be reasonable for 3GPP-defined and operator controlled applications such as IMS but is less realistic for general applications.

Yet another solution is to perform session binding based on some other identifier than the UE IP address available over both Gx and Rx interfaces. It may e.g. be possible to perform session binding based on subscriber identities available in Gx and Rx messages. The problem with this solution is that the subscriber identity is not always available to the AF. And even if the AF is aware of a subscriber identity and provides it over Rx it may be an application layer identity, e.g. a URI that is different than the access layer identity used on Gx, i.e. IMSI.

Another possibility that could be chosen when the NAT is co-located with the GW is that the PCEF function in the GW has access to the NAT binding state in the NAT. This would be solved internally in the GW. Then the PCRF can provide the public IP address IP@2 to the PCRF via Gx instead of the private IP address IP@2. The problem with this approach is that it only works if there is a 1:1 mapping between public and private IP addresses. When NAPT is used, the public IP address IP@2 is shared between many UEs and the session binding in PCRF becomes ambiguous.

This invention proposes different, but related, solutions to the problems described above. The basic idea is to make the PCRF aware of the NAT bindings of the UE.

Figure 3:
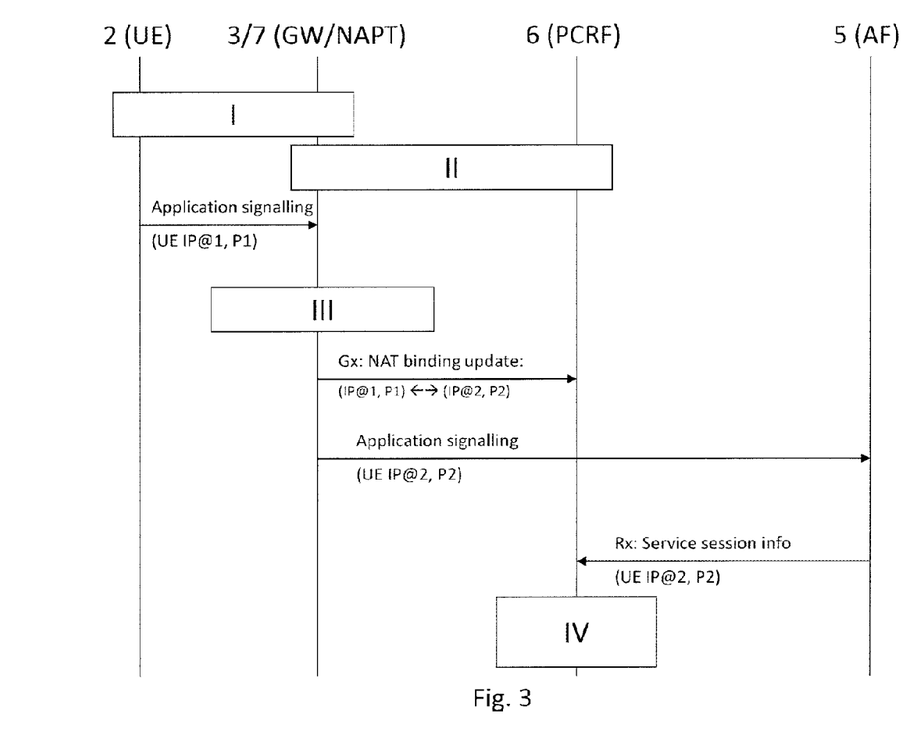
FIG. 3 schematically shows a call flow for a first aspect of the invention.

FIG. 3 schematically shows a call flow for a first aspect of the invention. Here the different entities of the network communication system 1 are indicated by vertical lines with the same numbering referring to the same entities as in FIGS. 1 and 2. The reference numbering 3/7 indicates that the NAT function 7 is co-located with the gateway 3 as seen in FIG. 1. The NAT function 7 and the gateway 3 may also be separated as seen in FIG. 2. This is valid for all aspects of the invention. The PCRF 6 is made aware of the NAT 7 bindings by sending a message to the PCRF 6 every time a new NAT 7 binding is created or an old NAT 7 binding is removed. In case the NAT 7 is collocated with the GW 3, this information is sent by the GW 3 on Gx. In case of standalone NAT 7, the information is sent by the NAT 7 over a new interface between the NAT function 7 and the PCRF 6. The PCRF 6 can then, based on the IP address and port information received in the Rx authorization, perform session binding with the correct Gx session.

The items I-IV in FIG. 3 read as follows:
I: PDN Connection/PDP Context has been established. UE IP address "P1" has been assigned
II: IP-CAN Session has been established with UE IP address IP@1.
III: Create NAT binding: (IP@1, P1)←→(IP@2, P2)
IV: PCRF can make session binding and bind Rx authorization to the correct IP-CAN session The items I-IV are preferably but not necessarily taken in order for the invention to perform as intended. Items I and II occur only once per IP connection. Items III and IV may happen more than once per IP connection.

Figure 4:
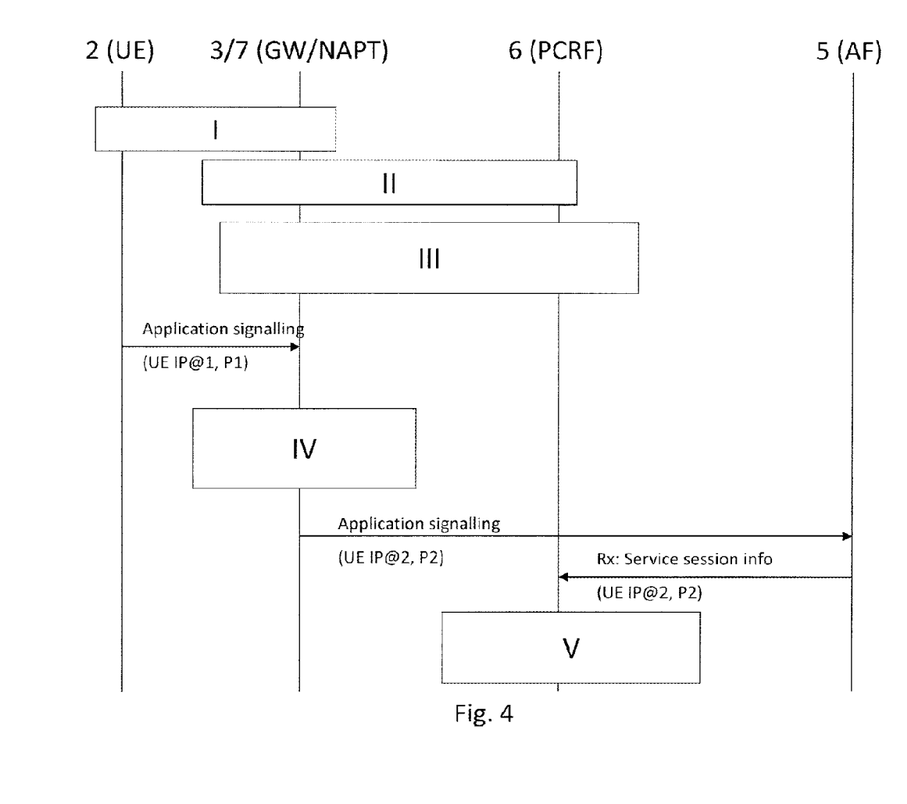
FIG. 4 schematically shows a call flow for a second aspect of the invention.

FIG. 4 schematically shows a call flow for a second aspect of the invention. In this alternative the NAT function 7 uses a specific global IP address and pre-allocates a port range for a UE 2 when the PDN Connection is created. The global IP address and the port range is provided to the PCRF 6 to make the PCRF 6 aware of the IP address and ports that may be assigned for the UE. Instead of port range, the GW 3 could also provide an index to the PCRF 6 that allows the PCRF 6 to determine what port range is to be used for the PDN Connection.

When the PCRF 6 receives a Rx authorization request containing an IP address and port number, the PCRF 6 performs session binding by matching the IP address and port with the IP address and port ranges that have been provided for the Gx sessions. Even though the global IP address may be shared by several UEs 2, each pre-allocated port range is only assigned to one specific UE 2.

The port range can also be pre-allocated when the first NAT 7 binding is created which may happen after the PDN Connection and IP-CAN session are established. The principles are however the same as described above.

It can also be possible for the GW/NAT 3/7 to update the port range by providing an additional port range and/or modified port range to the PCRF 6 during the lifetime of a PDN Connection (IP-CAN session). The GW/NAT 3/7 can also decrease the allocated port range and inform the PCRF 6.

The items I-V in FIG. 4 read as follows:
I: PDN Connection/PDP Context has been established. UE IP address "P1" has been assigned
II: NAT pre-allocates a public IP address (IP@2) and a port range (X . . . Y).
III: IP-CAN Session has been established with UE IP address IP©1. NAT binding info included: IP©2 and port range X . . . Y
IV: Create NAT binding. Port is chosen from the pre-allocated port range: (IP@1, P1) (IP@2, P2)
V: PCRF can make session binding and bind Rx authorization to the correct IP-CAN session The items I-V are preferably but not necessarily taken in order for the invention to perform as intended. Items I, II and III occur only once per IP connection. Items IV and V may happen more than once per IP connection.

Figure 5:
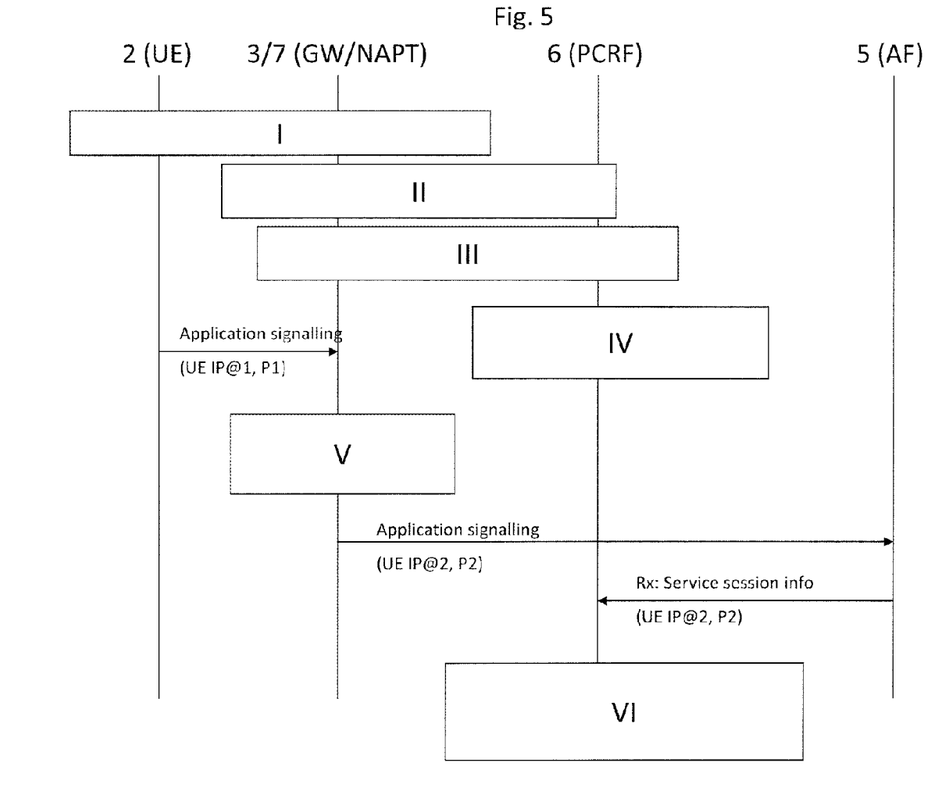
FIG. 5 schematically shows a call flow for a third aspect of the invention.

FIG. 5 schematically shows a call flow for a third aspect of the invention. An approach that has no impact on the current Gx interface is that the GW/NAT 3/7 and the PCRF 6 use a common algorithm to determine what port numbers are assigned to a UE 2 on the outside of the NAT 7. By doing this only the global IP address has to be signaled to the PCRF 6 which is possible using existing Gx protocol.

The GW 3 uses the common algorithm to determine what port numbers are allowed for the particular PDN Connection. When the NAT function 7 creates NAT 7 bindings for this PDN Connection, only the port numbers generated by the common algorithm may be used. Similarly, the PCRF 6 also uses the common algorithm to determine what port numbers are allowed for the given PDN Connection.

When the PCRF 6 receives an Rx authorization request containing an IP address and port number, the PCRF 6 performs session binding by matching the IP address and port with the IP address provided by the GW 3 for the IP-CAN session and the port numbers that are allowed according to the common algorithm. Even though the global IP address may be shared by several UEs 2, the port numbers generated by the common algorithm are only used for a specific PDN Connection.

An example of an algorithm is e.g. to generate port ranges based on a monotonically increasing counter/window. Every time an IP-CAN session for a specific IP address is created, the GW/NAT 3/7 and PCRF 6 increases this counter with one. If the value of the counter is already used by an active IP-CAN session, the GW 3 and PCRF 6 chooses the next value that is not used by an active PDN Connection. If, as an example, a maximum number of N ports is to be made available for each PDN connection, the port range could then defined as N*X . . . 256*(N+1)−1, where X is the value of the counter assigned for the PDN Connection. When the counter reaches X=256, it is reset to zero.

Another example that also does not have any impact on the Gx protocol specification is to re-use an existing AVP to inform the PCRF 6 about the selected port range for the PDN Connection. For example, the lowest 8 bits of the Charging ID could be used as an index for a suitable port range while the full 32 bits would constitute the Charging ID.

The items I-VI in FIG. 5 read as follows:

I: PDN Connection/PDP Context has been established. UE IP address "P1" has been assigned II: NAT pre-allocates a public IP address (IP@2).

III: IP-CAN Session has been established with UE IP address P@2.

IV: PCRF may determine the port values that may be used for this IP-CAN session using the common algorithm.

V: Create NAT binding. Port is chosen using a common algorithm: (IP@1, P1)←→(IP@2, P2)

VI: Since the PCRF is aware of UE IP address (IP@2) and can determine what port values may be assigned by the NAT for this UE, the PCRF can make session binding and bind the Rx authorization to the correct IP-CAN session The items I-VI are preferably but not necessarily taken in order for the invention to perform as intended. Items I-IV occur only once per IP connection. Items V and VI may happen more than once per IP connection.

Other algorithms within the scope of the invention are of course also possible.

This solution shown in FIG. 5 can also be combined with the solution shown in FIG. 4 in the sense that the solution shown in FIG. 5 is used as a default method that allows PCC operation with NATs without Gx impact. Then, if the GW needs to update the port range allocated for a UE during the lifetime of a PDN Connection, the solution shown in FIG. 4 with explicit signaling for port ranges can be used.

The invention claimed is:

1. A method for a network communication system comprising a user equipment, a gateway comprising a Policy and Charging Enforcement Function, an application function, a Policy and Charging Control Function and a Network Address Translator; where wherein the Policy and Charging Control Function communicates with the Policy and Charging Enforcement Function and the application function; wherein the user equipment connects to a network, wherein a Gx session is started between the Policy and Charging Enforcement Function and the Policy and Charging Control Function; wherein the user equipment starts a service session with the application function such that service signaling passes via the application function, wherein an Rx session is created between the Policy and Charging Control Function and the application function, and wherein a Network and Port Address Translator is positioned between the user equipment and the application function for handling the service session, characterized in that a message is sent to the Policy and Charging Control Function every time a new Network Address Translator binding is created or an old Network Address Translator binding is removed, such that the Policy and Charging Control Function is aware of any Network Address Translator bindings of the user equipment, the message comprising information associating a first IP address and a first port assigned to the user equipment for a network connection with a second IP address and a second port provided by the Network Address and Port Translator, wherein the gateway and Network Address Translator and the Policy and Charging Control Function use a common algorithm to determine what port numbers are assigned to the user equipment on the outside of the Network Address Translator, wherein using a common algorithm to determine what port numbers are assigned to the user equipment on the outside of the Network Address Translator comprises generating port ranges based at least in part on a monotonically increasing counter, such that each time a session for a specific IP address is created, the gateway and Network Address Translator and the Policy and Charging Control Function increase the counter by one.

2. The method according to claim 1, characterized in that: the gateway and Network Address Translator pre-allocates a port range on the outside of the Network Address Translator when a gateway PDN Connection is created; and the gateway provides this port range together with the global IP address to the Policy and Charging Control Function at an IP-CAN session establishment.

3. The method according to claim 1, wherein the Network Address Translator is a standalone Network Address Translator, and the message is sent over an interface between the Network Address Translator and the Policy and Charging Control Function.

4. A network communication system comprising a user equipment, a gateway comprising a Policy and Charging Enforcement Function, an application function, a Policy and Charging Control Function and a Network Address Translator; the Policy and Charging Control Function is in communication with the Policy and Charging Enforcement Function and the application function; the system being arranged in such a way that when the user equipment connects to a network, a Gx session is started between the Policy and Charging Enforcement Function and the Policy and Charging Control Function; wherein the system is arranged in such a way that the user equipment starts a service session with the application function such that service signaling passes via the application function; wherein an Rx session is created between the Policy and Charging Control Function and the application function; wherein a Network and Port Address Translator is positioned between the user equipment and the application function for handling the service session, characterized in that the Policy and Charging Control Function receives a message every time a new Network Address Translator binding is created or an old Network Address Translator binding is removed, such that the Policy and Charging Control Function is aware of any Network Address Translator bindings of the user equipment, the message comprising information associating a first IP address and a first port assigned to the user equipment for a network connection with a second IP address and a second port provided by the Network Address and Port Translator, wherein the gateway and Network Address Translator and the Policy and Charging Control Function are arranged to use a common algorithm to determine what port numbers are assigned to the user equipment on the outside of the Network Address Translator and are further arranged to generate port ranges based at least in part on a monotonically increasing counter, such that each time a session for a specific IP address is created, the gateway and the Policy and Charging Control Function increase the counter by one.

5. The system according to claim 4, characterized in that the gateway and Network Address Translator are arranged to pre-allocate a port range on the outside of the Network Address Translator when a gateway PDN Connection is created; and in that the Policy and Charging Control Function is provided this port range together with the global IP address at an IP-CAN session establishment by the gateway.

6. The system according to claim 4, wherein the Network Address Translator is a standalone Network Address Translator, and the message is received over an interface between the Network Address Translator and the Policy and Charging Control Function.

* * * * *

UNITED STATES PATENT AND TRADEMARK OFFICE
CERTIFICATE OF CORRECTION

| | |
|---|---|
| PATENT NO. | : 9,537,821 B2 |
| APPLICATION NO. | : 13/057982 |
| DATED | : January 3, 2017 |
| INVENTOR(S) | : Rommer et al. |

It is certified that error appears in the above-identified patent and that said Letters Patent is hereby corrected as shown below:

On the Title Page

In Item (57), under "ABSTRACT", in Column 2, Lines 2-3, delete "Policy and Charging Control Function" and insert -- Policy and Charging Rules Function --, therefor.

In the Specification

In Column 1, Line 39, delete "NAPT Network and Port Address Translator" and insert -- NAPT Network Address and Port Translator --, therefor.

In Column 1, Line 44, delete "PCRF Policy and Charging Control Function" and insert -- PCRF Policy and Charging Rules Function --, therefor.

In Column 2, Line 9, delete "Policy and Charging Control Function (PCRF)" and insert -- Policy and Charging Rules Function (PCRF) --, therefor.

In Column 2, Line 29, delete "Policy and Charging Control Function (PCRF)" and insert -- Policy and Charging Rules Function (PCRF) --, therefor.

In Column 2, Lines 66-67, delete "Policy and Charging Control Function (PCRF)" and insert -- Policy and Charging Rules Function (PCRF) --, therefor.

In Column 3, Line 1, delete "Policy and Charging Control Function (PCRF)" and insert -- Policy and Charging Rules Function (PCRF) --, therefor.

In Column 3, Lines 7-8, delete "Policy and Charging Control Function (PCRF)." and insert -- Policy and Charging Rules Function (PCRF). --, therefor.

In Column 3, Lines 13-14, delete "Policy and Charging Control Function (PCRF)" and insert -- Policy and Charging Rules Function (PCRF) --, therefor.

Signed and Sealed this
First Day of September, 2020

Andrei Iancu
*Director of the United States Patent and Trademark Office*

CERTIFICATE OF CORRECTION (continued)
U.S. Pat. No. 9,537,821 B2

In Column 3, Lines 14-15, delete "Network and Port Address Translator (NAPT)" and insert -- Network Address and Port Translator (NAPT) --, therefor.

In Column 3, Lines 17-18, delete "Policy and Charging Control Function (PCRF)" and insert -- Policy and Charging Rules Function (PCRF) --, therefor.

In Column 3, Lines 20-21, delete "Policy and Charging Control Function (PCRF)" and insert -- Policy and Charging Rules Function (PCRF) --, therefor.

In Column 3, Lines 28-29, delete "Policy and Charging Control Function (PCRF)" and insert -- Policy and Charging Rules Function (PCRF) --, therefor.

In Column 3, Line 34, delete "Policy and Charging Control Function (PCRF)" and insert -- Policy and Charging Rules Function (PCRF) --, therefor.

In Column 3, Line 52, delete "dynamically" and insert -- dynamically. --, therefor.

In Column 4, Lines 17-18, delete "Policy and Charging Control Function (PCRF)" and insert -- Policy and Charging Rules Function (PCRF) --, therefor.

In Column 4, Lines 19-20, delete "Network and Port Address Translator (NAPT)," and insert -- Network Address and Port Translator (NAPT), --, therefor.

In Column 6, Line 20, delete "IP©1." and insert -- IP@1. --, therefor.

In Column 6, Line 20, delete "IP©2" and insert -- IP@2 --, therefor.

In Column 7, Line 9, delete "P@2." and insert -- IP@2. --, therefor.

In the Claims

In Column 7, Line 36, in Claim 1, delete "Translator; where" and insert -- Translator; --, therefor.